Aug. 22, 1967     H. F. SILVER ET AL     3,337,026
SCROLL CONVEYOR
Original Filed March 14, 1962
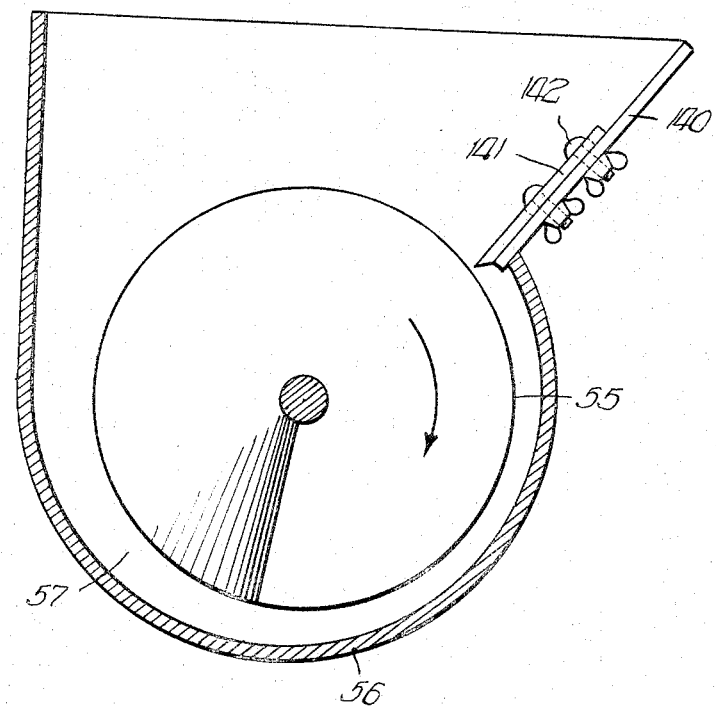
Inventors:
Harold F. Silver,
Clarence R. Steele,
Frank B. Price,
By Hume, Groen, Clement & Hume,
Attys.

United States Patent Office 3,337,026
Patented Aug. 22, 1967

3,337,026
SCROLL CONVEYOR
Harold F. Silver, Clarence R. Steele, and Frank B. Price, Denver, Colo., assignors, by direct and mesne assignments, to American Factors Associates, Limited, Honolulu, Hawaii, a corporation of Delaware
Original application Nov. 14, 1962, Ser. No. 237,575, now Patent No. 3,248,263, dated Apr. 26, 1966. Divided and this application Mar. 4, 1966, Ser. No. 531,666
1 Claim. (Cl. 198—213)

ABSTRACT OF THE DISCLOSURE

The invention is directed to a scroll conveyor adapted to handle sugar cane fibers to prevent jamming or wedging of material between the periphery of the scroll flight and the housing. An adjustable plate is mounted adjacent to the edge of the scroll flight. The housing increases in its spacing from the scroll flight in the direction of rotation of the conveyor.

---

This application is a division of applicants' copending application Ser. No. 237,575, filed Nov. 14, 1962, and entitled, "Solvent Extraction Process," now Patent No. 3,248,263. That application discloses apparatus especially adapted for the treatment of solid materials, such as sugar cane, when in subdivided form and of a size and consistency such as will provide a permeable mass which will lend itself to diffusion activity as described and claimed in said application.

It is desirable to employ scrolls for conveying such materials from one area to another area in such apparatus in order to enjoy the advantages of such scrolls, which are known to be generally efficient in use as well as easy and inexpensive to manufacture and maintain in operation.

However, it is a well known fact that certain fibrous materials, such as subdivided sugar cane, cannot be handled satisfactorily in conventional scroll conveyors because of the tendency of such materials to felt and mat and wedge between the periphery of the scroll flight and the housing for the scroll, with consequent jamming of the apparatus. The difficulty has been encountered when the use of conventional scroll conveyors was attempted for handling subdivided sugar cane.

Accordingly, an object of the present invention is to provide a novel construction for scroll conveyors which will render them capable of satisfactory use with various materials, such as subdivided sugar cane, and will permit the enjoyment of the advantages of using scroll conveyors with such materials without encountering jamming of the apparatus or unwanted felting, matting, or wedging of the material between the periphery of the scroll flight and the housing therefor.

The figure of the accompanying drawing is a cross-sectional, elevational view through a scroll conveyor and housing therefor constructed in accordance with this invention.

The scroll of this invention has made it entirely feasible to move masses of sugar cane fibers, or like material, by scrolls without suffering the jamming and clogging characteristics mentioned. This beneficial result flows from the construction illustrated in the figure of the drawing from which, it observed, a novel form of housing is provided around the scroll. This invention is applicable to all scrolls, including those employed in the apparatus disclosed in said copending application Ser. No. 237,575. The novelty resides in the construction and disposition of a housing indicated generally as 56 which has an inclined wall 140 which extends downwardly toward the scroll and terminates at a point adjacent the periphery of the scroll edge. Preferably located on the lower end of the inclined wall is a blade 141 which is suitably secured to the inclined wall 140 by adjustable attaching means 142. This blade, when adjusted in close proximity to the peripheral edge of the scroll, prevents the entrance of any sizable mass of matted material from wedging between the housing and the peripheral edge of the scroll. In addition, the housing 56 is so constructed as to provide a space 57 between the peripheral edge of the scroll 55 and the inside surface of the housing which, as shown in the drawing, is progressively greater from the blade 141 in the direction downstream from the point of feeding said scroll. The continually increasing space 57 between the scroll flight and the housing behind the blade in the direction of rotation of the scroll insures that there will be no wedging of material between the scroll and the housing to cause the jamming experienced with such material in conventional scrolls.

The form of this invention herein disclosed is illustrative and is given only by way of example. The scope of the invention is not to be limited thereby as it is intended that the appended claim be construed as broadly as may be permitted by the prior art.

We claim:

In a scroll conveyor adapted to handle sugar cane fibers and adapted to prevent jamming or wedging of the cane material between the periphery of the scroll flight and the housing, the combination comprising, rotatable scroll conveyor having a scroll flight, an inclined wall extending radially with respect to said scroll flight, said inclined wall extending downwardly toward said scroll conveyor and terminating in a lower end adjacent to the periphery of the edge of said scroll flight, said conveyor positioned with the upper portion of said scroll flight above said lower end of said inclined wall, an adjustable feed blade mounted radially with respect to said scroll flight and adjustably secured to and forming an extension of said inclined wall, adjustable attaching means for securing said feed blade to said inclined wall in close proximity to the peripheral edge of said scroll flight, means for rotating said scroll conveyor in a direction for directing the portion of said scroll flight above said inclined wall toward said feed blade, a housing having a portion extending under said scroll flight beginning at said inclined wall in the direction of rotation of said conveyor, said housing spaced from said scroll flight and on the side of said scroll flight downstream from said inclined wall spaced at an increasing distance from said scroll flight so that the space between the peripheral edge of said scroll flight and said housing becomes progressively greater for reducing the wedging and jamming of material between said housing and said scroll flight.

References Cited
UNITED STATES PATENTS 2,066,756   1/1937   Anderson _____ 198—64 X
2,410,943   11/1946  Huddle _____ 302—37

EVON C. BLUNK, *Primary Examiner.*
RICHARD E. AEGERTER, *Examiner.*